United States Patent [19]
Udagawa et al.

[11] Patent Number: 4,834,399
[45] Date of Patent: May 30, 1989

[54] STEEL LAMINATE GASKET

[75] Inventors: Tsunekazu Udagawa, Ichikawa; Susumu Inamura, Tokyo, both of Japan

[73] Assignee: Ishikawa Gasket Co., Ltd., Tokyo, Japan

[21] Appl. No.: 151,364

[22] Filed: Feb. 2, 1988

Related U.S. Application Data

[63] Continuation-in-part of Ser. No. 928,937, Nov. 10, 1986, abandoned.

[51] Int. Cl.$^4$ .............................................. F16J 15/10
[52] U.S. Cl. .................................. 277/234; 277/235 B
[58] Field of Search .................... 277/235 B, 233, 234, 277/213, 231, 232, 236, 207 R

[56] References Cited

U.S. PATENT DOCUMENTS

| 1,627,167 | 5/1927 | Fitzgerald | 277/235 B |
| 1,846,402 | 2/1932 | Oven | 277/235 B X |
| 2,034,610 | 3/1936 | Dickson | 277/235 B X |
| 2,114,442 | 4/1938 | Fitzgerald | 277/235 B X |
| 3,430,611 | 3/1969 | Belter | 277/235 B X |
| 3,567,234 | 3/1971 | Skrycki | 277/235 B |
| 4,140,323 | 2/1979 | Jacobs | 277/235 B X |
| 4,335,890 | 6/1982 | Nicholson | 277/235 B |
| 4,471,968 | 9/1984 | Schlaupitz et al. | 277/235 B |
| 4,620,710 | 11/1986 | Lambert et al. | 277/235 B |

FOREIGN PATENT DOCUMENTS

| 1264900 | 3/1968 | Fed. Rep. of Germany | 277/235 B |
| 2849018 | 5/1980 | Fed. Rep. of Germany | 277/235 B |
| 3528614 | 2/1987 | Fed. Rep. of Germany | 277/235 B |
| 954327 | 4/1964 | United Kingdom | 277/235 B |

Primary Examiner—Allan N. Shoap
Attorney, Agent, or Firm—Frank J. Jordan; C. Bruce Hamburg; Manabu Kanesaka

[57] ABSTRACT

A steel laminate gasket of the invention to be used for an internal combustion engine comprises a first plate and a second plate situated adjacent to the first plate. The first plate is provided with a first base section, first and second openings formed in the first base section and a first sealing structure integrally formed with the first base section around the first opening. The second plate is provided with a second base section placed over the first base section, a third opening formed in the second base section to be situated around the first opening, a fourth opening formed in the second base section, and a second sealing structure integrally formed with the second base section around the fourth opening. When the first and second plates are assembled, the first and second sealing structures do not lay over the second and first plates respectively and seal around holes of the engine.

25 Claims, 5 Drawing Sheets

STEEL LAMINATE GASKET

CROSS-REFERENCE TO RELATED APPLICATIONS

This is a continuation in part application of Ser. No. 928,937 filed on Nov. 10, 1986, now abandoned.

BACKGROUND OF THE INVENTION AND RELATED ART STATEMENT

The present invention relates to a steel laminate gasket, more particularly a steel laminate gasket of a very thin type.

A conventional steel laminate gasket is constructed by laminating several plates, and is provided with a complicated sealing portion around a hole to be sealed. Consequently, it is difficult to manufacture a steel laminate gasket with light weight. Also, productivity of a steel laminate gasket is poor. As a result, a cost of a steel laminate gasket is expensive than the other gaskets.

In a small engine, a gasket must be light in weight and be manufactured at a low cost. However, as explained above, a conventional steel laminate gasket is heavy and expensive, so that a conventional steel laminate gasket is not usually used for a small size engine. Cost and heavy weight prevent a conventional steel laminate gasket from being used in a small size engine.

Figure 1:
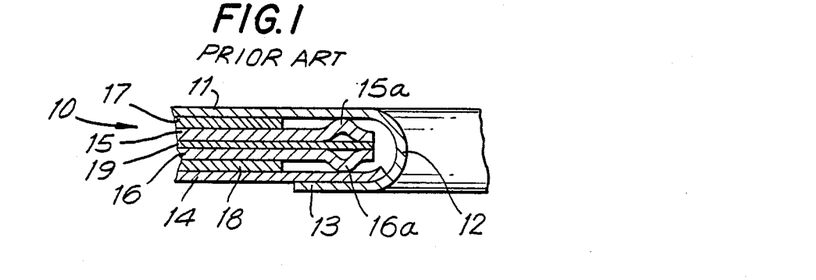
FIGS. 1-3 are partial vertical section views of the conventional steel laminate gaskets at a portion adjacent a hole of an engine.
Figure 2:
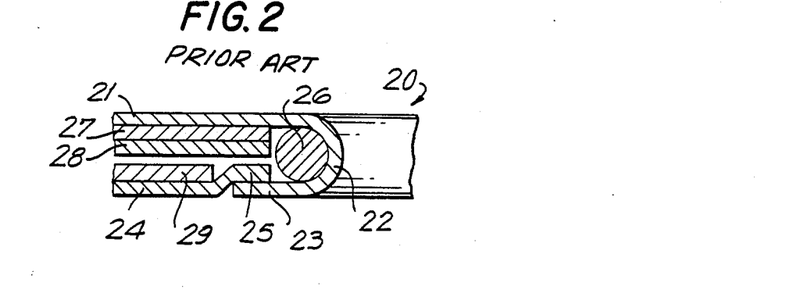
Figure 3:
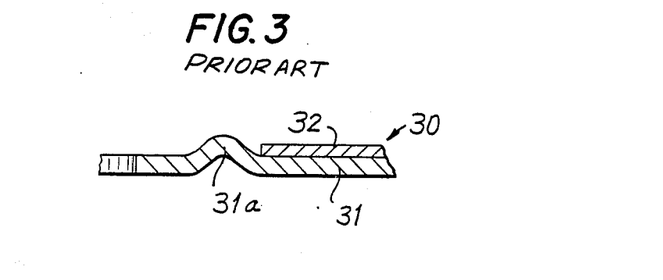

FIGS. 1-3 show conventional steel laminate gaskets. A gasket 10 as shown in FIG. 1 comprises an upper plate 11 having a curved portion 12 and a flange 13, and a lower plate 14, an end of which is situated inside the flange 13. Two inner plates 15, 16 with beads 15a, 16a are situated between the upper and lower plates 11, 14. Also, a plate 17 is situated between the upper plate 11 and the inner plate 15, and a plate 18 is situated between the lower plate 14 and the inner plate 16. A plate 19 is also situated between the inner plates 15, 16.

In this example, seven plates constitute one gasket. Further, this type of a gasket requires at least one surface pressure regulation plate to eliminate excess high pressure at a sealing portion, i.e. an area around the beads 15a, 16a. Namely, the surface pressure regulation plate receives tightening pressure together with the sealing portion to protect the sealing portion. In this example, the plates 17, 18 operate as surface pressure regulation plates. If the gasket 10 is tightened without the plates 17, 18, for example, strong tightening pressure is applied to the sealing portion, so that the sealing portion may, in an extreme situation, be broken.

A gasket 20 as shown in FIG. 2 comprises an upper plate 21 having a curved portion 22 and a flange 23, and a lower plate 24 having a stepped portion 25. A wire 26 is situated around the curved portion 22. Two inner plates 27, 28 and a plate 29 operating as a surface pressure regulation plate are situated between the upper and lower plates 21, 24. The plate 29 receives tightening pressure together with a sealing portion around the wire 26 to protect the sealing portion.

These conventional steel laminate gaskets are heavy, and include complicated sealing portions. Therefore, these gaskets can not be used for a small size engine with light weight.

On the other hand, a light weight gasket is disclosed in Japanese Utility Model Publication No. 59-188955 published on Dec. 14, 1984. A gasket disclosed in 59-188955 is shown in FIG. 3. The gasket 30 is designed to be used as a head gasket, which comprises a base plate 31 with a bead 31a, and a plate 32 situated on the base plate 31. The gasket 30 operates as intended when the gasket is used to seal around a low pressure area. However, since the bead 31a seals around a hole, the bead 31a can not provide high sealing pressure when tightened. Therefore, the gasket 30 can not be used for sealing a high pressure area.

Accordingly, one object of the present invention is to provide a steel laminate gasket, which is light in weight and simple in structure.

Another object of the present invention is to provide a steel laminate gasket as stated above, which can seal high and low pressure areas easily.

A further object of the present invention is to provide a steel laminate gasket as stated above, which can be easily and economically manufactured.

Further objects and advantages of the present invention will be apparent from the following description of the invention.

SUMMARY OF THE INVENTION

A steel laminate gasket of the present invention is used for an internal combustion engine having at least one cylinder bore and at least one through hole other than the cylinder fore. The gasket comprises a first plate and a second plate situated adjacent to the first plate. The first plate is provided with a first base section, first and second openings formed in the first base section, and a first sealing structure integrally formed with the first base section around the first opening. The first opening has a size corresponding to the cylinder bore of the engine, and the second opening has a size larger than the through hole of the engine.

The second plate is provided with a second base section placed over the first base section, a third opening formed in the second base section to be situated around the first opening, a fourth opening formed in the second base section, and a second sealing structure integrally formed with the second base section around the fourth opening. The third opening has a size larger than that of the first opening so that the second plate does not lay over the first sealing structure when the first and second plates are assembled together. The fourth opening has a size corresponding to the through hole of the engine. The first base section is located relative to the second sealing structure without laying over the second sealing structure so that the first and second base sections operate as surface pressure regulation plates for the first and second sealing structures.

The second plate of the gasket may be further provided with soft coatings on both sides thereof to increase sealing ability around the through hole of the engine. Similarly, the first plate of the gasket may be further provided with a hard layer on an outer surface of the first plate which does not face against the second plate. The hard layer has a property to withstand high temperature around the cylinder bore. The coatings with different properties can be easily formed on the first and second plates based on the requirement.

The second sealing structure is a bead formed around the fourth opening. On the other hand, the first sealing structure is provided with a flange situated over the first base section around the first opening, and a curved portion situated between the flange and the first base section to define the first opening. The curved portion has resiliency to tightly seal around the first opening when the gasket is tightened. The first sealing structure may be further provided with a seal ring situated between the flange and the first base section adjacent the curved portion.

The gasket of the present invention may further comprise a surface pressure regulation plate situated over the first base section at a side abutting against the second base section.

DETAILED DESCRIPTION OF PREFERRED EMBODIMENTS

Figure 4:
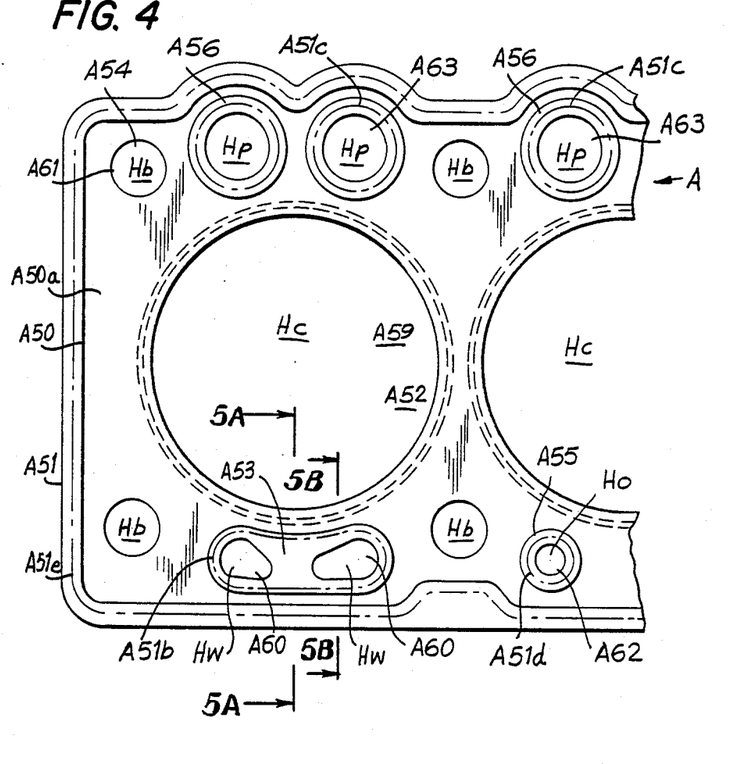
FIG. 4 is a partial plan view of a first embodiment of the steel laminate gasket of the present invention.
Figure 5A:
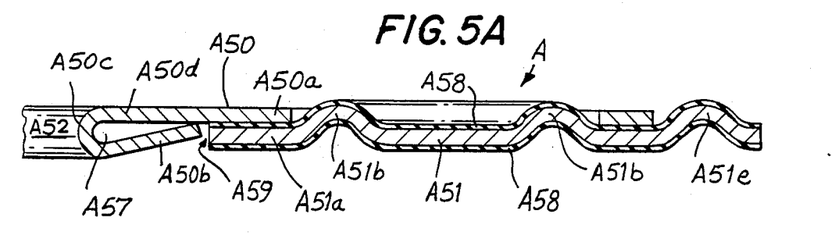
FIG. 5A is an enlarged section view taken along lines 5A—5A in FIG. 4.
Figure 5B:
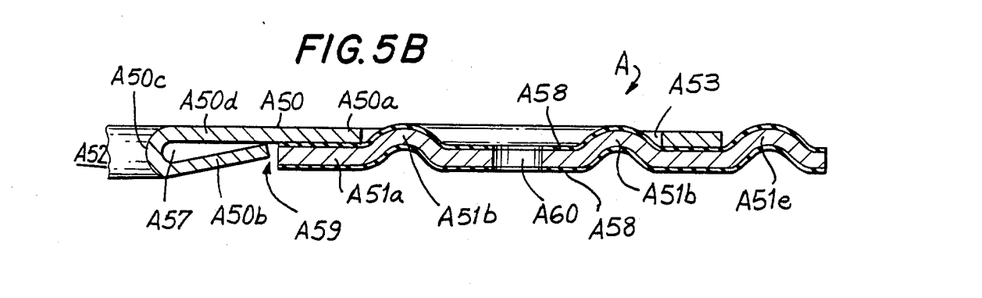
FIG. 5B is an enlarged section view taken along lines 5B—5B in FIG. 4.

Referring to FIGS. 4, 5A and 5B, a first embodiment A of a steel laminate gasket of the present invention is shown. The gasket A includes, as in the conventional gasket, cylinder bores Hc, bolt holes Hb, water holes Hw, oil holes Ho and push rod holes Hp.

The gasket A comprises an upper plate A50, and a lower plate A51. The contour or shape of the lower plate A51 is substantially the same as that of an engine block that the gasket A is placed. However, the contour of the upper plate A50 is slightly smaller than that of the lower plate A51.

The upper plate A50 is provided with bores A52 for the cylinder bore Hc, an enlarged hole A53 for the water holes Hw, holes A54 for the bolt holes Hb, a hole A55 for the oil hole Ho and holes A56 for the push rod holes Hp. The sizes of the bores A52 for the cylinder bore Hc and the holes A54 for the bolt holes Hb are exactly the same as those of the cylinder bore Hc and the bolt hole Hb. However, the sizes of the holes A56 for the push rod holes Hp and the hole A55 for the oil hole Ho are slightly larger than the actual sizes of the holes Hp and Ho. The enlarged hole A53 are designed to encircle the two water holes Hw.

The upper plate A50 is divided into several parts, i.e. a base section A50a abutting against the lower plate A51, flanges A50b formed around the cylinder bores Hc, curved portions A50c to define the cylinder bores Hc and counter flange portions A50d facing against the flanges A50b. The base section A50a, flanges A50b, curved portions A50c and counter flange portions A50d are integrally formed together.

The flange A50b is turned at the curved portion A50c to be located over the counter flange portion A50d. When the curved portion A50c is formed, a space A57 is formed between the flange A50b and the counter flange portion A50d. The thickness of the gasket A at the curved portion A50c must be thicker than the total thickness of the upper and lower plates A50, A51. Also, the curved portion A50c must have strong resiliency.

As a result, when the gasket A is placed between engine blocks and is tightened, the curved portion A50c is pushed and deformed. Since the curved portion A50c has strong resiliency, the portion around the cylinder bore Hc is securely sealed at the curved portion A50c. The curved portion A50c withstands high pressure in the cylinder bore Hc.

As shown in FIGS. 5A and 5B, the lower plate A51 is provided with coatings A58 on upper and lower surfaces thereof. The coating should be a soft coating having good adhesive property. Examples of the coating are silicone rubber, silicone resin, N.B.R., fluorine rubber and so on.

The lower plate A51 is provided with bores A59 for the cylinder bore Hc, holes A60 for the water holes Hw, holes A61 for the bolt holes Hb, a hole A62 for the oil hole Ho, and holes A63 for the push rod holes Hp. The sizes of the holes A60, A61, A62 and A63 are exactly the same as those of the water holes Hw, bolt holes Hb, oil hole Ho and push rod holes Hp, respectively. However, the size of the bore A59 for the cylinder bore Hc is larger than that of the cylinder bore Hc.

The lower plate A51 is divided into several parts, i.e. a base section A51a abutting against the base section A50a of the upper plate A50, and parts not abutting against the base section A50a. The lower plate A51 is provided with beads at the parts not abutting against the base section A50a. In FIG. 4, the beads are shown as one point chain lines.

In particular, a bead A51b is formed on the lower plate A51 to surround the two holes A60 for the water holes. Beads A51c and A51d are formed adjacent to the holes A63 and A62 for the push rod holes and oil hole, respectively. Also, a bead A51e is formed adjacent to the outer periphery of the lower plate A51. The height of the beads A51b, A51c, A51d and A51e is higher than the total thickness of the upper and lower plates A50, A51.

When the upper and lower plates A50, A51 are assembled together, the bead A51b is located just inside the enlarged hole A53, and similarly, the beads A51c and A51d are, respectively, located just inside the holes A56 and A55. However, when the upper and lower plates A50, A51 are assembled, the bead A51e is located outside the upper plate A50. Since the bores A59 are larger than the cylinder bores Hc, when the upper and lower plates A50, A51 are assembled, the bores A59 are located outside the flange A50b.

In the gasket A, it is important that the flange A50b of the upper plate A50 does not lay over the lower plate A51, and the beads A51b, A51c A51d and A51e do not lay over the upper plate A50. Namely, the base section A50a of the upper plate A50 and the base section A51a of the lower plate A51 abut against each other directly.

Therefore, when the gasket A is situated between two engine blocks and tightened, the flanges A50b and curved portions A50c are pushed to seal around the cylinder bores Hc, and the beads A51b, A51c and A51d are pushed to seal around the water holes Hw, push rod holes Hp and oil holes Ho, respectively. The bead A51b surrounds the two holes A60 for the water holes Hw, so that water can flow from one to the other. Since water does not leak beyond the bead A51b, this does not cause any trouble. If required, the beads may be formed for the respective water holes. The bead A51e secondarily seals around the outer periphery of the gasket A.

In the gasket A, the flange A50b and counter flange portion A50d abut against the engine blocks, and the beads A51b, A51c, A51d, A51e directly abut against the engine blocks. When the gasket A is tightened, pressure is applied to the base sections A50a, A51a, but the sealing pressures are formed by the curved portion A50c and the beads A51b, A51c, A51d, A51e. Namely, the base sections A50a, A51a operate as surface pressure regulation plates. In particular, the base section A51a operates as a surface pressure regulation plate for the flange A50b and the curved portion A50c, while the base section A50a operates as a surface pressure regulation plate for the beads A51b, A51c, A51d, A51e.

Therefore, the sealing pressure around the cylinder bore Hc can be determined by the physical property of the upper plate A50 and the thickness of the lower plate A51. On the other hand, the sealing pressure around the holes for water, oil and so on can be determined by the physical property of the lower plate A51 and the thickness of the upper plate A50. The sealing characteristics can be easily determined by the upper and lower plates A50, A51.

Further, in the gasket A, high pressure areas around the cylinder bores Hc are sealed only by the upper plate A50, while non-high pressure areas adjacent holes other than the cylinder bores Hc are sealed only by the lower plate A51. Therefore, best materials for the high pressure areas and non-high pressure areas can be easily selected.

As a result, creep relaxation which may occur near the cylinder bores and other holes can be efficiently prevented.

Figure 6:
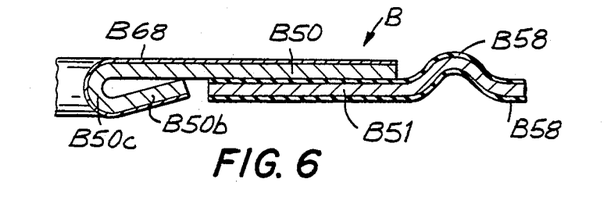
FIGS. 6-16 are enlarged section views similar to FIG. 5 for showing second to twelfth embodiments of the invention.

FIG. 6 shows a second embodiment B of the steel laminate gasket of the present invention. The gasket B has substantially the same structure as the gasket A, i.e. an upper plate B50 with a flange B50b and a curved portion B50c, a lower plate B51 with soft coatings B58, and so on.

In the gasket B, however, the upper plate B50 is provided with an outer layer B68 on an entire outer surface thereof. The outer layer B68 should have a property to withstand high temperature and high pressure as well as to allow the upper plate B50 to slide relative to a member that the upper plate B50 abuts. Namely, in case the gasket B is situated between a cylinder block and a cylinder head made of aluminum, when an engine is actuated, the cylinder head expands laterally at a rate different from those of the gasket and cylinder block. Actually, the cylinder head expands significantly due to high heat expansion rate. In this respect, if the gasket B does not slide relative to the cylinder head, the gasket receives high stress, which in an extreme situation, breaks the gasket.

Accordingly, in case the outer layer B68 having sliding property is formed on the upper plate B50, the cylinder head can slide freely relative to the gasket B. As a result, it is possible to reduce stress applied to the gasket and prevent breakage of the gasket.

The outer layer B68 may be formed by coating or plating. When the outer layer B68 is formed by coating, the coating must be a hard coating, such as a molybdenum coating or a fluorine resin. When the outer layer B68 is formed by plating, an aluminum plating or nickel plating is preferred.

In case the outer layer B68 is formed on the outer surface of the upper plate B50, the upper plate B50 is protected against high temperature. Further, the upper plate B50 may slide relative to the engine block when the upper plate B50 expands due to high temperature, so that stress formed in the upper plate B50 can be released. The creep relaxation of the gasket is significantly prevented by formation of the outer layer B68.

Figure 7:
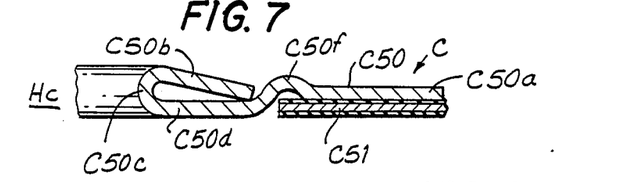

FIG. 7 shows a third embodiment C of the steel laminate gasket of the present invention. The gasket C has substantially the same structure as the gasket A, i.e. an upper plate C50, a lower plate C51, and so on.

In the gasket C, however, the upper plate C50 is provided with a curved portion C50f, a counter flange portion C50d, a curved portion C50c and a flange C50b. The counter flange portion C50d is located on the same plane as the lower plate C51, and the flange C50b is located above the counter flange portion C50d. The curved portion C50f allows the counter flange portion C50d to extend from a base section C50a toward the lower plate C51. Also, the curved portion C50f operates as an auxiliary bead for sealing around the cylinder bore Hc when the gasket C is tightened.

The gasket C operates substantially the same as in the gasket A. However, since the curved portion C50f operates as an auxiliary bead, the portion around the cylinder bore Hc is sealed further securely.

Figure 8:
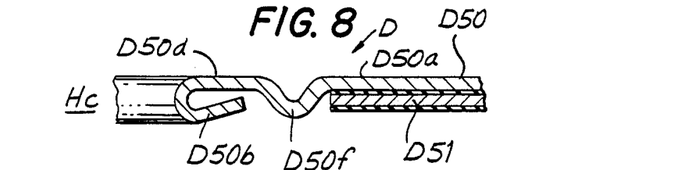

FIG. 8 shows a fourth embodiment D of the steel laminate gasket of the present invention. The gasket D has substantially the same structure as the gasket A, i.e. an upper plate D50 with a flange D50b and a counter flange portion D50d, a lower plate D51, and so on.

In the gasket D, however, the upper plate D50 is provided with a curved portion or bead D50f between a base section D50a and the counter flange portion D50d. The curved portion D50f extends in the direction toward the lower plate D51. The height of the curved portion D50f is higher than the total thickness of the plates D50 and D51. Therefore, when the gasket D is tightened, the curved portion D50f operates to further seal around the cylinder bore Hc. The gasket D operates substantially the same as in the gasket C.

Figure 9:
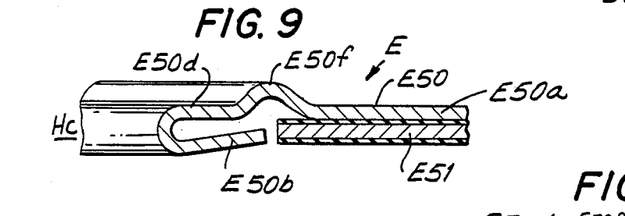

FIG. 9 shows a fifth embodiment E of the steel laminate gasket of the present invention. The gasket E has substantially the same structure as the gasket A, i.e. an upper plate E50 with a flange E50b and a counter flange portion E50d, a lower plate E51 and so on.

In the gasket E, however, the upper plate E50 is provided with a curved portion E50f between a base section E50a and the counter flange portion E50d. The curved potion E50f extends in the direction away from the lower plate E51. When the gasket E is used, the gasket E operates substantially the same as the gasket A. However, a portion around the cylinder bore Hc is further sealed by the curved portion E50f.

Figure 10:
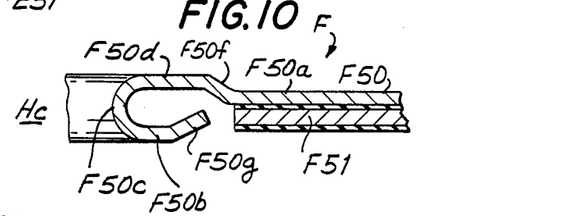

FIG. 10 shows a sixth embodiment F of the steel laminate gasket of the present invention. The gasket F has substantially the same structure as the gasket A, i.e. an upper plate F50 with a flange F50b and a counter flange portion F50d, a lower plate F51 and so on.

In the gasket F, however, the upper plate F50 is provided with a diagonal portion F50f between a base section F50a and the counter flange portion F50d, and a flange end portion F50g inclined in the direction toward the diagonal portion F50f. The distance between the flange F50b and the counter flange portion F50d is thicker than the total thickness of the upper and lower plates F50, F51.

When the gasket F is tightened, a curved portion F50c is crashed, and the distance between the flange F50b and the counter flange portion F50d decreases so that the flange end portion F50g abuts against the diagonal portion F50f. As a result, a portion around the cylinder bore Hc is sealed by the curved portion F50c, flange end portion F50g and diagonal portion F50f. Rest of the operation of the gasket F is the same as the gasket A.

Figure 11:
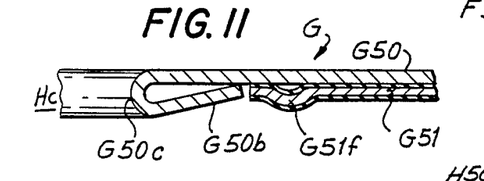

FIG. 11 shows a seventh embodiment G of the steel laminate gasket of the present invention. The gasket G has substantially the same structure as the gasket A, i.e. an upper plate G50 with a flange G50b, a lower plate G51 and so on.

In the gasket G, however, the lower plate G51 is provided with a curved portion G51f adjacent the flange G50b. When the gasket G is tightened, the curved portion G51f deforms and operates to assist sealing around the cylinder bore Hc in addition to the flange G50b and curved portion G50c. Rest of the operation of the gasket G is the same as the gasket A.

Figure 12:
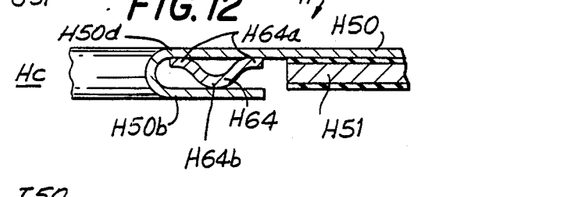

FIG. 12 shows an eighth embodiment H of the steel laminate gasket of the present invention. The gasket H has substantially the same structure as the gasket A, i.e. an upper plate H50 with a flange H50b and a counter flange portion H50d, a lower plate H51 and so on.

In the gasket H, a seal ring H64 is further situated between the flange H50b and the counter flange portion H50d. The seal ring H64 includes two end portions H64a and a top portion H64b, and possesses resiliency. Therefore, when the gasket H is tightened, a portion around the cylinder bore Hc can be sealed strongly by the seal ring H64. Rest of the structure is the same as the gasket A. The gasket H is especially useful when high sealing pressure is required around the cylinder bore Hc.

Figure 13:
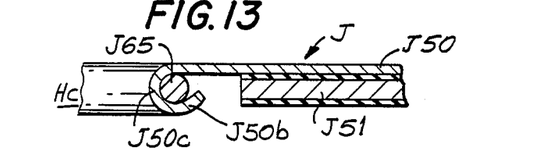

FIG. 13 shows a ninth embodiment J of the steel laminate gasket of the present invention. The gasket J has substantially the same structure as the gasket A, i.e. an upper plate J50, lower plate J51 and so on.

In the gasket J, a wire ring J65 is situated inside a curved portion J50c. The wire ring J65 does not deform too much even if high pressure is applied to the gasket. Therefore, the gasket J is especially useful in case the engine block is required to be tightened strongly. The rest of the structure and operation of the gasket J is the same as the gasket A.

Figure 14:
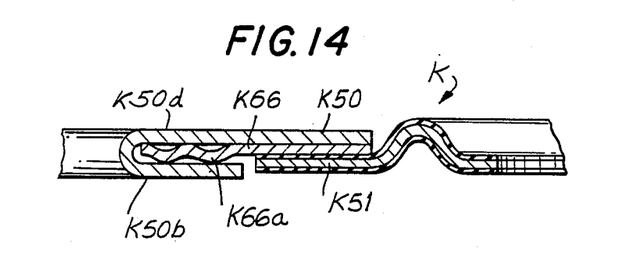

FIG. 14 shows a tenth embodiment K of the steel laminate gasket of the present invention. The gasket K has substantially the same structure as the gasket A, i.e. an upper plate K50, lower plate K51 and so on.

In the gasket K, however, a surface pressure regulation plate K66 is further situated between the upper plate K50 and lower plate K51. The surface pressure regulation plate K66 substantially extends as in the upper plate K50 and includes a plurality of corrugations K66a at a portion between a flange K50b and a counter flange portion K50d. The corrugations K66a provide resiliency for the flange K50b, so that when the gasket K is tightened, a portion around the cylinder bore Hc can be sealed tightly. The gasket K operates as in the gasket A.

Figure 15:
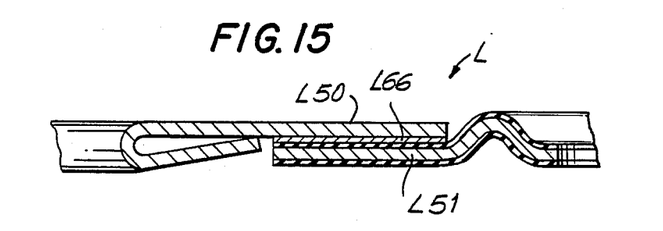

FIG. 15 shows an eleventh embodiment L of the steel laminate gasket of the present invention. The gasket L has substantially the same structure as the gasket A. However, the gasket L is further provided with a surface pressure regulation plate L66. The plate L66 is situated between a base section L50a and a base section L51a.

Figure 16:
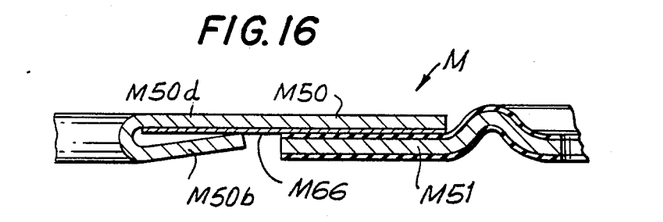

FIG. 16 shows a twelfth embodiment M of the steel laminate gasket of the present invention. The gasket M is similar to the gasket L. However, a surface pressure regulation plate M66 of the gasket M extends into a portion between a flange M50b and a counter flange portion M50d.

As shown in the embodiments K, L and M, the surface pressure regulation plates may be provided when required. The thickness and size can be decided in accordance with requirement of an engine. The gaskets with the surface pressure regulation plates operates as in the gasket A.

Figure 17:
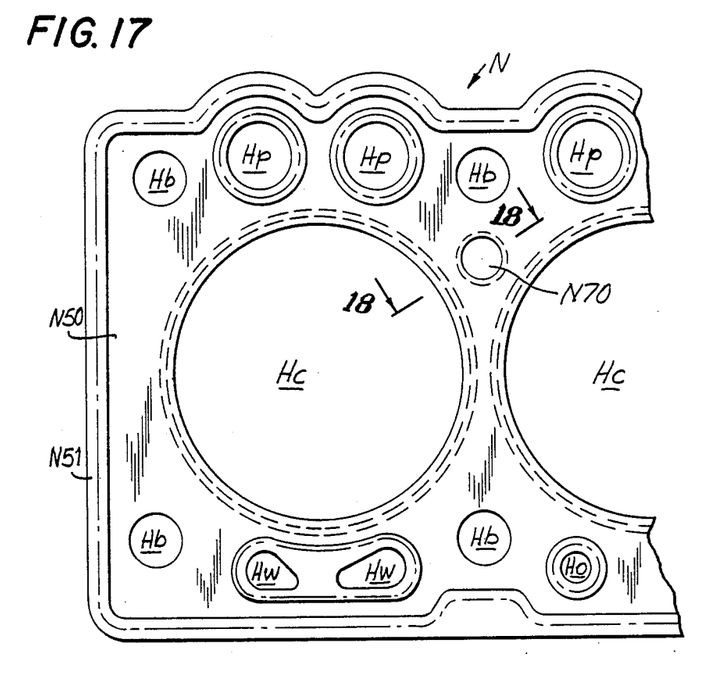
FIG. 17 is a partial plan view similar to FIG. 4 for showing a thirteenth embodiment of the invention.
Figure 18:
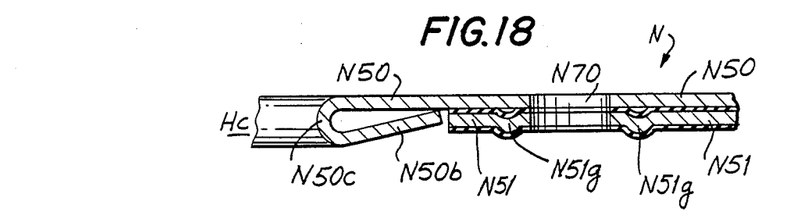
FIG. 18 is an enlarged section view taken along lines 18—18 in FIG. 17.

FIGS. 17 and 18 show a thirteenth embodiment N of the steel laminate gasket of the present invention. The gasket N comprises an upper plate N50 with a flange N50b and a curved portion N50c, and a lower plate N51, as in the gasket A. However, the gasket N further includes a water hole N70 close to the cylinder holes Hc. As clearly shown in FIG. 18, the size of the water hole N70 in the upper and lower plates N50, N51 is exactly the same, but the lower plate N51 is provided with a bead N51g around the hole N70.

In the gasket N, since the water hole N70 is located close to the cylinder holes, the water hole N70 must be tightly sealed. Therefore, the size of the water hole N70 in the upper and lower plates N50, N51 is made the same, and the bead N51g is formed around the hole N70. As a result, the water hole N70 can be sealed tightly.

As explained above, if required, some of the water holes, oil holes and so on may be made so that the size of the holes in the upper and lower plates is made the same and a bead is formed around the hole on the upper or lower plate. As a result, the area around the hole can be sealed tightly.

Figure 19:
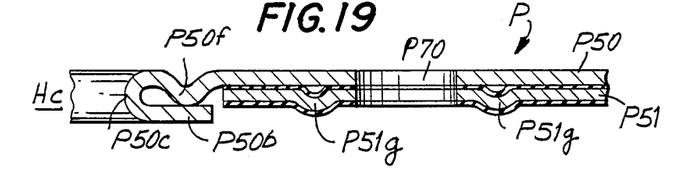
FIG. 19 is an enlarged section view similar to FIG. 18 for showing a fourteenth embodiment of the invention.

FIG. 19 shows a fourteenth embodiment P of the steel laminate gasket of the present invention. The gasket P comprises an upper plate P50 with a flange P50b and a curved portion P50c, and a lower plate P51. The upper plate P50 further includes at a counter flange portion a bead P50f abutting against the flange P50b, and the lower plate P51 includes a bead P51g around a water hole P70, similar to the gasket N.

In the gasket P, the size of the water hole P70 in the upper and lower plates P50, P51 is made the same, and the bead P51g is formed around the water hole P70. Therefore, the water hole P70 is sealed tightly when the gasket is tightened. Also, since the bead P50f is formed around the cylinder hole Hc, the cylinder hole Hc is sealed tightly as well.

The invention has been explained with reference to the specific embodiments of the invention, but the explanation is illustrative and the invention is limited only by the appended claims.

What is claimed is:

1. A steel laminate gasket for an internal combustion engine having at least one cylinder bore and at least one through hole other than the cylinder bore, comprising:

a first plate including a first base section, at least one first opening formed in the first base section, said first opening having a size corresponding to the cylinder bore of the engine, at least one second opening formed in the first base section, said second opening having a size larger than the through hole of the engine, and at least one first sealing structure integrally formed with the first base section around the first opening, and a second plate situated adjacent to the first plate, said second plate including a second base section placed over the first base section, at least one third opening formed in the second base section to be situated around the first opening, said third opening having a size larger than that of the first opening so that the second plate does not lay over the first sealing structure when the first and second plates are assembled together, at least one fourth opening formed in the second base section, said fourth opening having a size corresponding to the through hole of the engine, and at least one second sealing structure integrally formed with the second base section around the fourth opening, said first base section being located relative to the second sealing structure without laying over the second sealing structure so that the first and second base sections operate as surface pressure regulation plates for the first and second sealing structures.

2. A steel laminate gasket according to claim 1, in which said first sealing structure extends partially through the third opening of the second plate, and said second sealing structure extends partially through the second opening of the first plate, the height of the first and second sealing structures being greater than the total thickness of the first and second plates.

3. A steel laminate gasket according to claim 2, in which said second plate further includes soft coatings on both sides thereof to increase sealing ability around the through hole of the engine.

4. A steel laminate gasket according to claim 3, in which said first plate further includes a hard layer on an outer surface of the first plate which does not face against the second plate.

5. A steel laminate gasket according to claim 4, in which said hard layer is made of a hard coating.

6. A steel laminate gasket according to claim 4, in which said hard layer is made of a plating.

7. A steel laminate gasket according to claim 2, in which said second sealing structure is a bead formed around the fourth opening.

8. A steel laminate gasket according to claim 7, in which said first sealing structure includes a flange situated over the first base section around the first opening, and a curved portion situated between the flange and the first base section to define the first opening and having resiliency to tightly seal around the first opening when the gasket is tightened.

9. A steel laminate gasket according to claim 8, in which said first sealing structure further includes a counter flange portion on the first base section facing against the flange, and an auxiliary bead formed on the first base section outside the counter flange portion relative to the first opening.

10. A steel laminate gasket according to claim 9, in which said auxiliary bead extends in the direction away from the second plate, said counter flange portion being located in the plane substantially the same as the plane in the second plate, and said flange being located on the same side of the auxiliary bead.

11. A steel laminate gasket according to claim 9, in which said auxiliary bead extends in the direction away from the second plate, said counter flange portion being located in the plane substantially the same as the plane in the first plate, and said flange being located on the same side of the second plate.

12. A steel laminate gasket according to claim 9, in which said auxiliary bead extends in the direction toward the second plate, said counter flange portion being located in the plane substantially the same as the plane in the first plate, and said flange being located on the same side as the second plate.

13. A steel laminate gasket according to claim 8, in which said first sealing structure further includes a counter flange portion on the first base section facing against the flange, a diagonal portion formed on the first base section outside the counter flange portion relative to the first opening so that the counter flange portion is located further away from the second plate relative to the first base section, and a flange end portion formed on the flange, said flange end portion being inclined relative to the flange to orient toward the first base section.

14. A steel laminate gasket according to claim 8, in which said first sealing structure further includes a seal ring situated between the flange and the first base section adjacent the curved portion.

15. A steel laminate gasket according to claim 14, in which said seal ring is in the form of a corrugation having a bead and edge portions situated at both ends of the bead.

16. A steel laminate gasket according to claim 14, in which said seal ring is a wire ring.

17. A steel laminate gasket according to claim 8, in which said second plate further includes an auxiliary bead formed on the second base section around the third opening.

18. A steel laminate gasket according to claim 8, further comprising a surface pressure regulation plate situated over the first base section at a side abutting against the second base section.

19. A steel laminate gasket according to claim 18, in which said surface pressure regulation plate is situated at a portion where the first and second base sections overlap with each other.

20. A steel laminate gasket according to claim 18, in which said surface pressure regulation plate includes corrugations at a portion abutting against the flange to provide sealing pressure around the first opening.

21. A steel laminate gasket according to claim 1, in which said second base section further includes a third sealing structure around an entire outer peripheral portion thereof, an outer periphery of said first base section being located inside the outer peripheral portion of the second base section without laying over the third sealing structure.

22. A steel laminate gasket according to claim 21, in which said second and third sealing structures are beads, said first sealing structure including a flange situated over the first base section and a curved portion situated between the flange and the first base section.

23. A steel laminate gasket according to claim 1, further comprising at least one fifth opening formed in the first base section, said fifth opening corresponding to a through hole of an engine, at least one sixth opening formed in the second base section and having a size substantially the same as the fifth opening, and a fourth sealing structure formed on one of the first and second plates adjacent the fifth and sixth openings to seal therearound.

24. A steel laminate gasket according to claim 23, in which said second and fourth sealing structures are beads, said first sealing structure including a flange situated over the first base section and a curved portion situated between the flange and the first base section.

25. A steel laminate gasket according to claim 24, in which said first sealing structure further includes a bead formed on the first base section around the first opening, said bead abutting against the flange to tightly seal around the first opening when the gasket is tightened.

* * * * *